(12) United States Patent
Hall

(10) Patent No.: US 6,234,200 B1
(45) Date of Patent: May 22, 2001

(54) FLOW CONTROL DEVICES

(76) Inventor: Kerry Victor Hall, 133 Darley Street, Monavace NSW 2103 (AU)

( * ) Notice: Subject to any disclaimer, the term of this patent is extended or adjusted under 35 U.S.C. 154(b) by 0 days.

(21) Appl. No.: 09/461,116

(22) Filed: Dec. 14, 1999

(51) Int. Cl.$^7$ ............................. B01D 25/00; C02F 1/40
(52) U.S. Cl. ..................... 137/590; 210/488; 210/521; 210/532.2
(58) Field of Search .................... 137/590, 592; 210/336, 488, 521, 532.2

(56) References Cited

U.S. PATENT DOCUMENTS 4,710,295  12/1987  Zabel .
5,101,849  *  4/1992  Richard ........................... 137/590 X

* cited by examiner

Primary Examiner—Kevin Lee
(74) Attorney, Agent, or Firm—Kelly Bauersfeld Lowry & Kelley, LLP

(57) ABSTRACT

An apparatus for controlling liquid flow from a holding vessel to a discharge line wherein insoluble material received into the vessel with liquid is intended to be retained in the vessel. The apparatus comprises wall means within which an interior cavity is defined for connection to the discharge line at a location below the surface of liquid in the vessel, apertures spaced along the wall means for admitting liquid from the vessel into the cavity, wall elements between the apertures providing inclined confronting ramps between which pockets are provided such that the liquid therein is relatively quiescent to facilitate movement upwardly of buoyant components of the insoluble material to be deflected by the superior ramp towards the top of the vessel and movement downwardly of non-buoyant components of the insoluble material to be deflected by the inferior ramp towards the bottom of the vessel. The apertures are configured and dimensioned to control flow of liquid into the interior cavity whereby under surges of flow into the vessel there is substantial resistance to liquid discharged through the discharge line having entrained therewith the insoluble material.

14 Claims, 2 Drawing Sheets

US 6,234,200 B1

FLOW CONTROL DEVICES

FIELD OF THE INVENTION

The present invention relates to liquid flow control and is especially applicable to the controlling of flow towards a discharge line in a separator vessel, such as a grease trap. The vessel is intended to permit separation of insoluble components from a liquid and typically the insoluble components will comprise buoyant components (such as fats and grease) and non-buoyant components (such as heavy solid particles).

The object is to control flow so that only clear liquid drawn from an intermediate level of the materials in the vessel is discharged.

BACKGROUND TO THE INVENTION

A conventional approach to the problem as applied to such installations as grease traps and septic tanks is to provide sufficient volume and separation of inlet and outlets with appropriate baffles to have sufficient holding time of the liquid and insoluble materials for separation to occur naturally. However, this process is not entirely reliable and contamination of e.g. sewer lines or absorption trenches can occur. This is especially the case where it is necessary or simply desirable to have a vessel of relatively small dimensions and a frequent problem occurs where there are major surges of flow into the vessel. Surges can produce turbulence and the rapid increase of liquid in the vessel displaces a corresponding volume rapidly through the discharge line. Thus entrainment of both buoyant and non-buoyant contaminants can all too easily occur.

For exemplification only the invention will be described and with reference to grease traps but it is to be understood the invention is not so restricted and applies to all similar installations.

Generally, commercial establishments such as restaurants are obliged to install and maintain a grease trap for waste water and at regular intervals the grease trap will need to be pumped free of major build ups of both buoyant and non-buoyant contaminants. Filter type units have been extensively employed to try and control unintended discharge of contaminants into the waste water and such filter units have been positioned around the normal liquid level and generally have been of a removable cartridge type. In a typical restaurant type facility a grease trap must be pumped to remove contaminants every few weeks and the contractor should also change the cartridge type filter. However, the expense of grease trap servicing is significant and proprietors will be tempted to remove filters to ensure longer time between serving. If the filter is not regularly serviced, then there is likely to become clogging due to greases at the surface of the liquid in the vessel and, especially under the surge conditions which frequently arise, waste water may flood back into the premises.

One form of such filter comprises a rigid collection of shaped plates which have apertures between the plates to provide the filter structure. The plates are disposed horizontally and the cartridge has a vertical axis. An example of such as filter is that of U.S. Pat. No. 4,710,295 (Zabel).

SUMMARY OF THE INVENTION

The present invention is based on a different approach to the processing e.g. waste water and is based on the concept of providing a control device positioned at an intermediate level in a waste water tank to protect a discharge line and to facilitate separation of both buoyant and non-buoyant contaminants in the inlet water even under demanding surge conditions. The invention also extends to analogous applications for separation of other contaminated liquids.

The present invention manifests itself in various aspects including a fluid flow control device, a liquid processing system and a method of processing contaminated liquids.

According to a first aspect of the present invention, there is provided apparatus for controlling liquid flow from a holding vessel to a discharge line wherein insoluble material received into the vessel with liquid is intended to be retained in the vessel, the apparatus having:

(i) wall means within which an interior cavity is defined for connection to the discharge line at a location below the surface of liquid in the vessel, (ii) apertures spaced along the wall means for admitting liquid from the vessel into the interior cavity, (iii) wall elements between the apertures providing inclined ramps which confront one another and between which pockets are provided for receiving the liquid in a relatively quiescent state whereby movement upwardly of buoyant components of the insoluble material towards the top of the vessel occurs with deflection of the buoyant components by superior ones of said ramps, and movement downwardly of non-buoyat components of the insoluble material towards the bottom of the vessel occurs with deflection by inferior ones of the ramps, and (iv) the apertures being configured and dimensioned to restrict and control flow of liquid into the interior cavity whereby under surges of flow into the vessel there is substantial resistance to liquid discharge through the discharge line.

Preferably the apparatus comprises a multiplicity of plate elements interconnected to form the body of the apparatus, each plate element comprising a disk having a central aperture and a serpentine continuous wall structure extending from the disk and providing the confronting ramps, spacing means being provided so that the edge of each inclined ramps is closely spaced from the disk of the adjacent plate element.

Preferably the apparatus is adapted to have a horizontal axis around which the interior cavity is defined, several confronting pairs of ramps are provided on each side of the apparatus and each aperture is in the form of a slit extending substantially entirely around the apparatus.

The invention extends to a waste water treatment apparatus such as a grease trap and having an inlet at a first upper region of the vessel and an outlet at a spaced second upper region for the vessel, the outlet having a pipe extending downwardly into a central region of the vessel and connected to a liquid flow control apparatus as described in any one of the forms above such that buoyant contaminant material floats to the surface of the liquid in the vessel and solid contaminant material sinks to the bottom of the vessel for periodic cleaning by pump out and substantially clarified liquid migrates from the central region of the vessel into the interior cavity and then to the discharge line.

Further inventive and novel features may be incorporated in embodiments of the invention as will be described below with reference to the drawings It will be appreciated that particularly with preferred embodiments an efficient control device can be manufactured and which is essentially of a self cleaning character, thereby permitting the device to be installed in a central region of the grease trap and there is no requirement for periodic removal or cleaning in ordinary use. The device can be manufactured in a robust and durable form and its operation can ensure a high level of separation of contaminants from waste water, thereby protecting the environment while obviating expensive regular servicing costs required for prior art filter type devices.

Embodiments of the invention lend themselves to retro-fitting to existing grease traps or other liquid pre-treatment vessels and it is believed that compared to prior art proposals a substantial increase in efficiency can be achieved It is believed that prior art pre-treatment separator vessels such as grease traps have been relatively inefficient and this is especially the case when applied to modern installations liable to high surges, e.g. due to dishwasher discharges and the general increase in higher water consumption due to more thorough and cleaning operations that are often required in modern commercial operations to comply with health regulations.

BRIEF DESCRIPTION OF THE DRAWINGS

Referring now to the accompanying drawings.

DETAILED DESCRIPTION OF THE DRAWINGS

Figure 1:
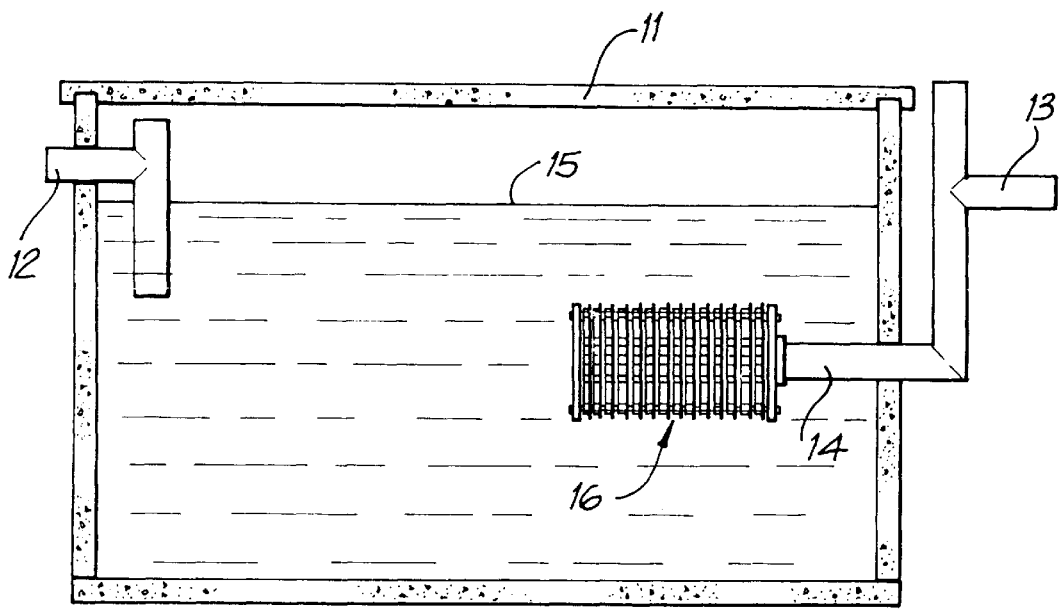
FIG. 1 is a schematic general arrangement of a pre-treatment vessel typically used as a grease trap.

The pre-treatment vessel 10 shown in FIG. 1 is typically of a reinforced rectangular box structure having a lid 11, an inlet pipe 12 and an outlet pipe 13. The inlet pipe has a T-shaped structure and the outlet pipe is connected to a pick-up tube 14 which extends from a central region of the vessel to the outlet pipe. The water level 15 is normally near the top of the vessel and as further effluent is supplied through the inlet, a corresponding volume of water will be discharged through the outlet, subject to control of the flow control device embodying the present invention.

The flow control device is in the form of a plate type separator 16 mounted about a horizontal axis to the end of the pick up pipe 14.

Figure 3:
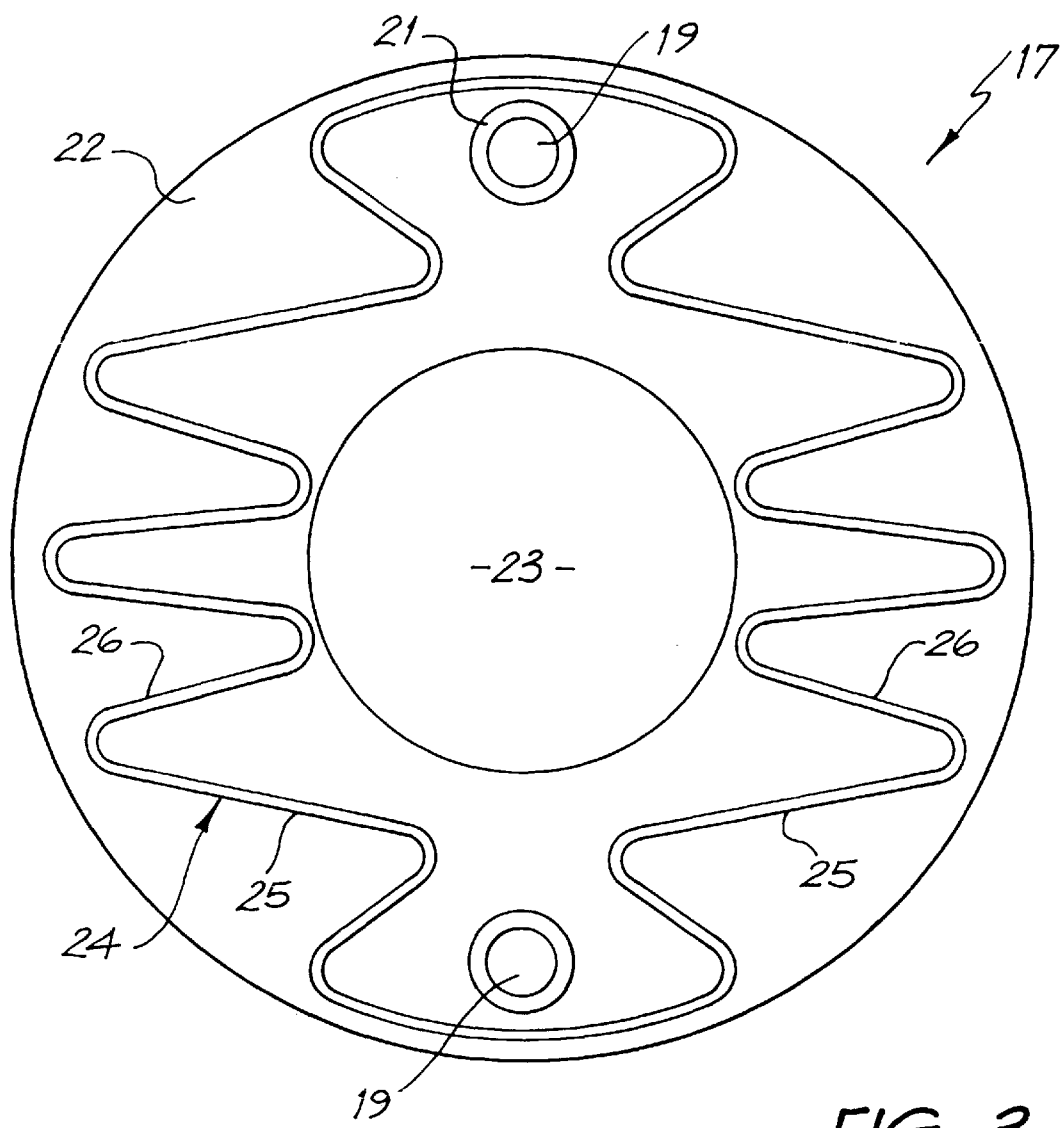
FIG. 3 is a plan view on an enlarged scale of one of the separator plate elements and taken along the line III—III of FIG. 2.
Figure 4:
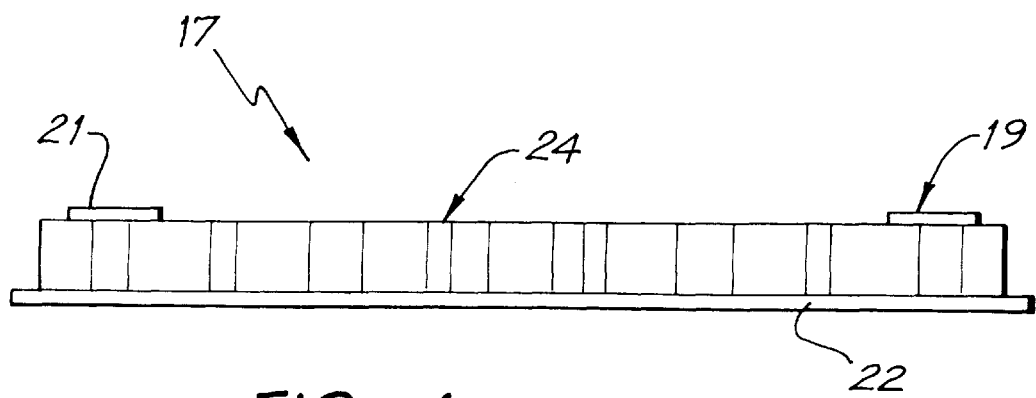
FIG. 4 is a side elevation of the separator plate of FIG. 3.

The plate separator 16 comprises a stack of plate elements 17, each of which is shown in more detail in FIGS. 3 and 4.

The stack of plate separators is assembled with upper and lower stainless steel threaded rods 18 which extend through integral cylindrical tubes 19 which also have a spacer function. Nuts 20 secure the assembly so that the exposed end face 21 of each spacer tube abuts the face of the annular disk 22 of the next plate element, thereby providing an annular slot through which liquid migrates into a central cavity.

Each plate element as best shown in FIGS. 3 and 4 has an annular disk 22 with a central aperture 23 and a continuous serpentine wall 24 having pairs of opposed ramp surfaces namely upwardly directed ramps 25 and downwardly directed ramps 26.

The disk element is integrally moulded in plastics materials and, as best shown in FIG. 4, each of the cylindrical spacers 19 and 21 extends beyond the edge of the serpentine wall 24 by approximately 3 millimetres so that a continuous slot is provided between the adjacent separator plates.

Figure 2:
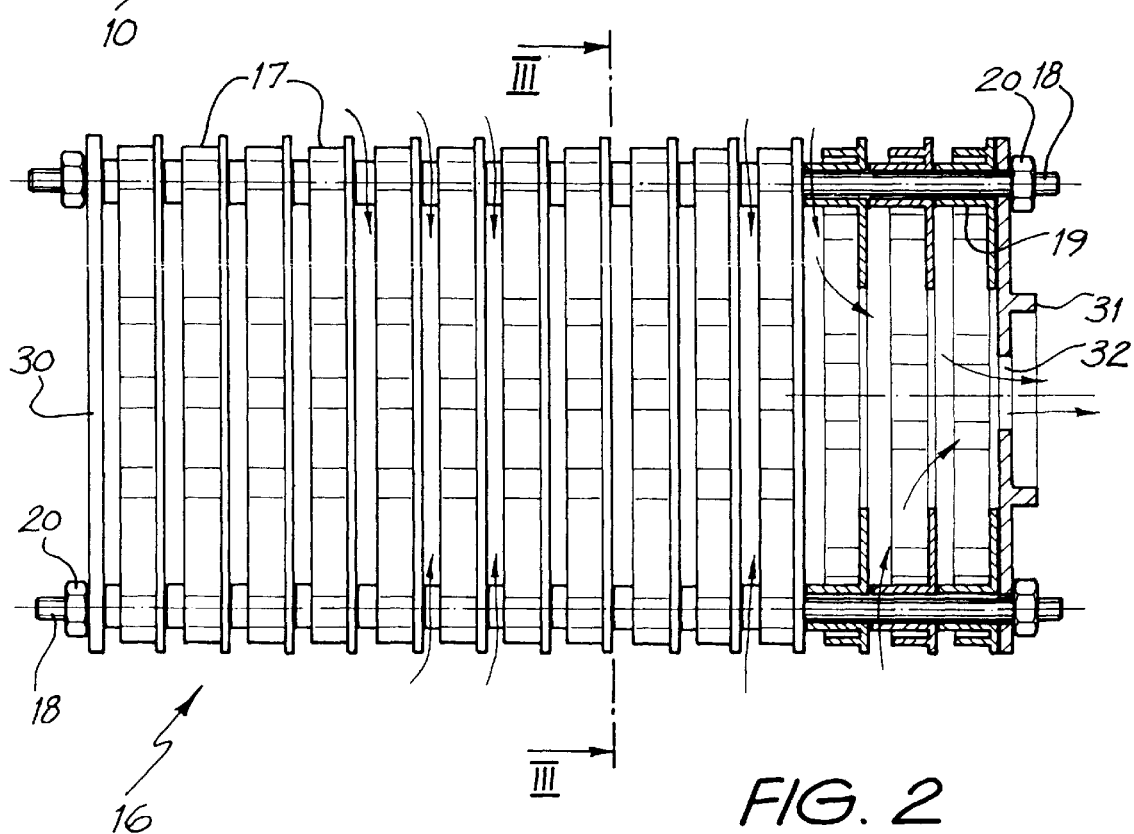
FIG. 2 is a view of the flow control device embodied in the invention in a schematic form and on an enlarged scale.

As shown in FIG. 2 the assembled plate separator includes an end cap 30 on the left hand end and on the right hand end has a tubular coupling 31 for connection to the pipe 14.

The end plate element, however, has a restricted diameter central aperture 32 as indicated in FIG. 2 compared with the apertures in other plate elements. A consequence of this feature is that under surge conditions there is a small pressure differential in the liquid surrounding the unit and the central cavity 23 and a further more significant pressure drop through the aperture 32 This arrangement facilitates the separation process and maintains flow conditions to provide a high efficiency of separation and steady discharge of water after an inlet surge has occurred.

I claim:

1. An apparatus for controlling liquid flow from a holding vessel to a discharge line wherein insoluble material received into the vessel with liquid is intended to be retained in the vessel, the apparatus having:

(i) a wall within which an interior cavity is defined for connection to the discharge line at a location below the surface of liquid in the vessel, (ii) apertures spaced along the wall means for admitting liquid from the vessel into the interior cavity, (iii) wall elements between the apertures providing inclined ramps which confront one another and between which pockets are provided for receiving the liquid in a quiescent state whereby:

(a) movement upwardly of buoyant components of the insoluble material towards the top of the vessel occurs with deflection of the buoyant components by upwardly directed ramps, and (b) movement downwardly of non-buoyant components of the insoluble material towards the bottom of the vessel occurs with deflection by downwardly directed ramps, and (iv) the apertures being configured and dimensioned to restrict and control flow of liquid into the interior cavity whereby under surges of flow into the vessel there is substantial resistance to liquid discharge through the discharge line.

2. An apparatus as claimed in claim 1, wherein the apparatus comprises a multiplicity of plate elements interconnected to form a body of the apparatus, each plate element comprising a disk having a central aperture and a serpentine continuous wall structure extending from the disk and providing the confronting ramps, spacing means being provided so that the edge of each of the inclined ramps is closely spaced from the disk of the adjacent plate element and the central apertures of the plate elements collectively providing a duct along which liquid can be displaced to the discharge line when further liquid is introduced into the vessel.

3. An apparatus as claimed in claim 2, wherein the apparatus is adapted to have a horizontal axis around which the interior cavity is defined, a plurality of confronting pairs of ramps being provided offset from the horizontal axis on opposite sides, and each aperture being in the form of a slit extending substantially entirely around the apparatus between adjacent plate elements.

4. An apparatus as claimed in claim 3, wherein of the order of ten plate elements are provided.

5. An apparatus as claimed in claim 2, wherein at one end of the apparatus an end wall is provided closely spaced from the end plate element and at the opposite end of the apparatus a discharge connector is provided for connecting the central aperture of the adjacent plate element to the discharge line.

6. An apparatus as claimed in claim 5, wherein the discharge connector has a relatively small cross sectional area central aperture for restricting liquid flow into the discharge line under surge conditions.

7. An apparatus as claimed in any one of claims 2 to 6 wherein the apparatus has a plurality of connector rods extending through respective apertures in the plate elements, each plate element having a tubular portion for receiving each connecting rod, the tubular portion having an axial length greater than the axial dimension of the serpentine wall structure thereby establishing spacing means between adjacent plate elements.

8. A liquid flow control apparatus as claimed in claim 4 and further comprising at one end of the apparatus an end wall provided closely spaced from the end plate element and at the opposite end of the apparatus a discharge connector provided for connecting the central aperture of the adjacent plate element to the discharge line and the discharge connector has a relatively small cross sectional area central aperture for restricting liquid flow into the discharge line under surge conditions.

9. A liquid flow control apparatus as claimed in claim 8 wherein each plate element has an annular disc portion having a central aperture and the serpentine wall structure extending from a first face of the plate element and spacer elements extending from the disc element to cause spacing between the multiplicity of plate elements when clamped together with the slit extending substantially around the apparatus.

10. A waste water treatment apparatus having a vessel, an inlet at a first upper region of the vessel and an outlet for discharging liquid from the vessel upon introduction of a further volume of liquid, and liquid flow control apparatus as claimed in claim 1 mounted within the vessel to control flow of liquid from the vessel to the outlet and to initiate separation of buoyant and non-buoyant insoluble components in the liquid.

11. An apparatus as claimed in claim 10 wherein the liquid flow control apparatus comprises a multiplicity of plate elements interconnected to form a body of the apparatus, each plate element comprising a disk having a central aperture and a serpentine continuous wall structure extending from the disk and providing the confronting ramps, spacing means being provided so that the edge of each of the inclined ramps is closely spaced from the disk of the adjacent plate element and the central apertures of the plate elements collectively providing a duct along which liquid can be displaced to the discharge line when further liquid is introduced into the vessel.

12. An apparatus as claimed in claim 11 wherein the liquid flow control apparatus is adapted to have a horizontal axis around which the interior cavity is defined, a plurality of confronting pairs of ramps being provided offset from the horizontal axis on opposite sides, and each aperture being in the form of a slit extending substantially entirely around the apparatus between adjacent plate elements.

13. A plate element for an apparatus as claimed in claim 3 and comprising an annular disc portion having a central aperture and the serpentine wall structure extending from a first face of the plate element and spacer elements extending from the disc element to cause spacing between the multiplicity of plate elements when clamped together with the slit extending substantially around the apparatus.

14. A plate element as claimed in claim 9 and wherein the spacer elements are tubular, are located within the serpentine wall structure and extend from the first face of the disc element for receiving respective connecting rods which are adapted to be clamped around the multiplicity of plate elements.

* * * * *